W. S. STONER.
CANDY WRAPPER.
APPLICATION FILED OCT. 23, 1919.

1,348,761.

Patented Aug. 3, 1920.

WITNESSES

INVENTOR
Winifred S. Stoner
ATTORNEYS

UNITED STATES PATENT OFFICE.

WINIFRED SACKVILLE STONER, OF NEW YORK, N. Y., ASSIGNOR TO NEWARK PARAFFINE & PARCHMENT PAPER CO., OF NEW YORK, N. Y., A CORPORATION.

CANDY-WRAPPER.

1,348,761. Specification of Letters Patent. Patented Aug. 3, 1920.

Application filed October 23, 1919. Serial No. 332,664.

*To all whom it may concern:*

Be it known that I, WINIFRED S. STONER, a citizen of the United States, and a resident of Manhattan, county of New York, State of New York, have invented a new and useful Candy-Wrapper, of which the following is a full, clear, and exact description.

This invention relates in general to candy wrappers, and has reference more particularly to a wrapper for that kind of candy known to the trade as lolly pops, in which instance the wrapper in its preferred form has the characteristic qualities of a paper doll.

As heretofore practised, lolly pops and like candy have been offered to the trade wrapped in a plain sheet of paraffined paper with the wrapper only inclosing the candy part of the lolly pop. This wrapper is only employed as a protection for the candy and has no utility other than that, and the same is likewise discarded when the candy is to be consumed.

The object of the present invention is to provide a wrapper which will not only act as a protection for the candy but at the same time so construct the same as to offer unusual inducement to the purchaser of the candy in that aside from purchasing the candy they are in reality purchasing a paper doll which may be used as a source of amusement when inclosing the candy, and even after the candy has been removed the wrapper will still maintain its doll characteristics.

The accompanying drawing illustrates one form of the invention, but it is of course to be understood that the ornamental design on the wrapper as well as the pictorial illustration may be varied without departing from the spirit of the invention.

In said drawing, Figure 1 is a view of the wrapper before it has been folded around the lolly pop.

Figure 1:
Figure 2:
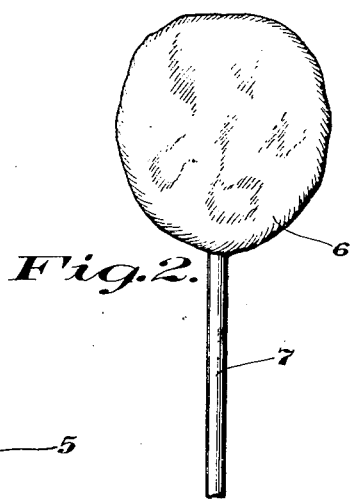
Fig. 2 is a view of a lolly pop.
Figure 3:
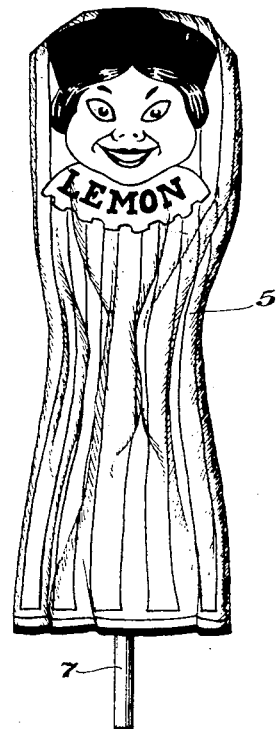
Fig. 3 is a front view of the wrapper as applied around a lolly pop.

Referring to the drawing in detail the wrapper preferably comprises a relatively long sheet of paraffined or waxed paper 5, having printed thereon some ornamental design of any desirable color, with a pictorial illustration such for instance as the head of a child arranged about in the middle thereof. According to the showing on the drawing the pictorial illustration is provided with a collar effect on which may be printed the flavor of the lolly pop covered by the wrapper. The lolly pop is illustrated as comprising a piece of candy 6 having the usual stick or handle 7. The wrapper is adapted to be folded around the lolly pop with the candy part 6 thereof providing a form for the pictorial illustration, and with the remainder of the sheet arranged to provide a skirted body portion for the pictorial illustration with the edge of the skirt terminating preferably above the end of the stick or handle 7.

The wrapper is in no way fastened around the lolly pop thus the lolly pop can be removed from the wrapper by withdrawing the same from the end of the skirted body portion by the stick, thus leaving the wrapper intact and capable of being used for the purpose specified.

Having thus described my invention what I claim as new and desire to secure by Letters Patent is as follows:

1. A candy wrapper comprising a sheet of material having a pictorial illustration about in the middle thereof; said wrapper adapted to be folded around a candy form to produce an article having some of the characteristic qualities of a doll, the said candy form providing a filler for the pictorial illustration and the remainder of the sheet arranged to provide a skirted body portion for the said pictorial illustration.

2. A candy wrapper comprising a sheet of material having a pictorial illustration of a head arranged approximately in the center thereof, said wrapper adapted to be folded about a form to produce an article having some of the characteristic qualities of the head, the said form providing a filler for the pictorial illustration, and the remainder of the sheet arranged to provide a skirted body portion for the said pictorial illustration.

3. As a new article of manufacture, a candy wrapper comprising a sheet of material having a pictorial illustration in approximately the center thereof, the said wrapper adapted to be folded about a candy form to produce an article embodying some of the characteristics of the pictorial illustration, the said candy form providing a filler for the latter.

WINIFRED SACKVILLE STONER.